US010354358B2

(12) United States Patent
Higuchi et al.

(10) Patent No.: US 10,354,358 B2
(45) Date of Patent: Jul. 16, 2019

(54) IMAGE GENERATION DEVICE, COORDINATE TRANSFORMATION TABLE CREATION DEVICE AND CREATION METHOD

(71) Applicant: CLARION CO., LTD., Saitama-shi, Saitama (JP)

(72) Inventors: Haruhiko Higuchi, Tokyo (JP); Mitsuo Nakajima, Tokyo (JP); Katsuo Onozaki, Saitama (JP); Yoshitaka Uchida, Saitama (JP); Takayuki Shioya, Saitama (JP)

(73) Assignee: CLARION CO., LTD., Saitama (JP)

( * ) Notice: Subject to any disclaimer, the term of this patent is extended or adjusted under 35 U.S.C. 154(b) by 28 days.

(21) Appl. No.: 15/541,922

(22) PCT Filed: Nov. 27, 2015

(86) PCT No.: PCT/JP2015/083462
§ 371 (c)(1),
(2) Date: Jul. 6, 2017

(87) PCT Pub. No.: WO2016/125371
PCT Pub. Date: Aug. 11, 2016

(65) Prior Publication Data
US 2017/0358056 A1 Dec. 14, 2017

(30) Foreign Application Priority Data

Feb. 5, 2015 (JP) .................................. 2015-021163

(51) Int. Cl.
*G06T 3/00* (2006.01)
*G06T 1/00* (2006.01)
(Continued)

(52) U.S. Cl.
CPC .............. *G06T 3/0012* (2013.01); *G06T 1/00* (2013.01); *G06T 3/00* (2013.01); *G06T 3/0006* (2013.01);
(Continued)

(58) Field of Classification Search
None
See application file for complete search history.

(56) References Cited

U.S. PATENT DOCUMENTS

| 2012/0147224 A1* | 6/2012 | Takayama | G06T 3/4038 348/241 |
| 2013/0065682 A1* | 3/2013 | Izuno | A63F 13/428 463/31 |
| 2015/0221122 A1* | 8/2015 | Son | G06T 15/205 345/422 |

FOREIGN PATENT DOCUMENTS

| EP | 2053860 A1 | 4/2009 |
| JP | 2005-333442 A | 12/2005 |

(Continued)

OTHER PUBLICATIONS

International Search Report, PCT/JP2015/083462, dated Jan. 12, 2016, 1 pg.
(Continued)

*Primary Examiner* — Vikkram Bali
(74) *Attorney, Agent, or Firm* — Volpe and Koenig, P.C.

(57) ABSTRACT

An image generation device performs coordinate transformation, based on a coordinate transformation table, to a two-dimensional first image having a span in a horizontal direction and a vertical direction and acquired by overlooking and imaging an object from a first viewpoint at a first depression angle, and generates and outputs a second image which was obtained by overlooking the object from a second viewpoint which is different from the first viewpoint at a second depression angle which is different from the first
(Continued)

depression angle. The coordinate transformation table is a table for transforming coordinates of a plurality of first selected pixels selected from a plurality of first pixels constituting the first image into coordinates of second selected pixels corresponding to a plurality of second pixels constituting the second image.

5 Claims, 13 Drawing Sheets

(51) Int. Cl.
  *H04N 7/18* (2006.01)
  *G06T 7/40* (2017.01)
  *B60R 1/00* (2006.01)

(52) U.S. Cl.
  CPC ............... *G06T 7/40* (2013.01); *H04N 7/18* (2013.01); *B60R 1/00* (2013.01); *G06T 2207/20221* (2013.01); *G06T 2207/30252* (2013.01)

(56) References Cited

FOREIGN PATENT DOCUMENTS

| JP | 2009-122763 A | 6/2009 |
| JP | 2015-097335 A | 5/2015 |

OTHER PUBLICATIONS

Extended European Search Report dated Aug. 31, 2018 for the European Patent Application No. 15881188.5.

\* cited by examiner

FIG.1
(A)
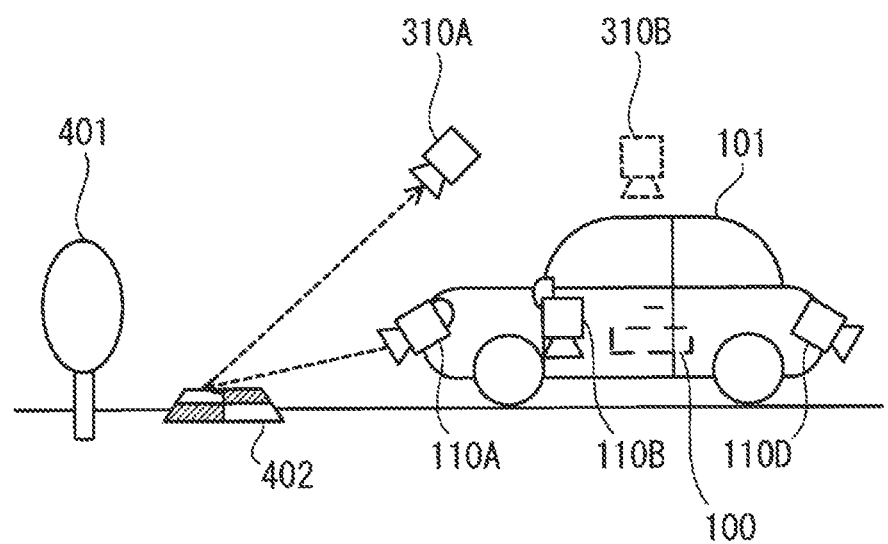
(B)
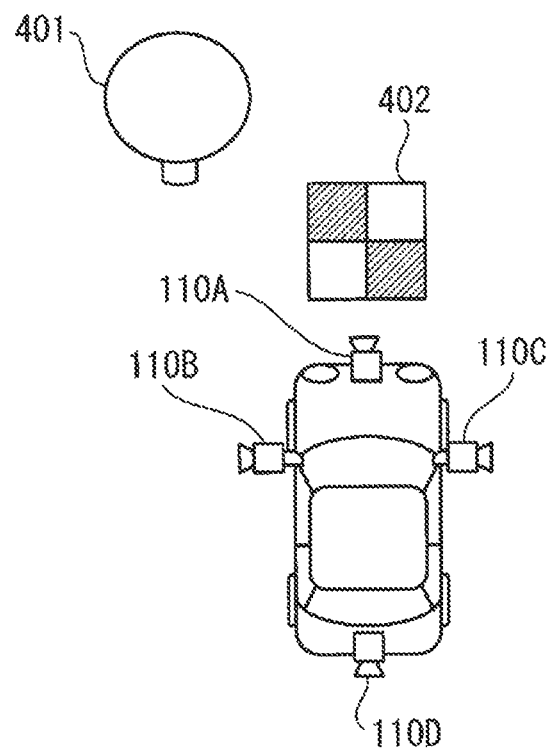

FIG.2
(A) CAPTURED IMAGE 70
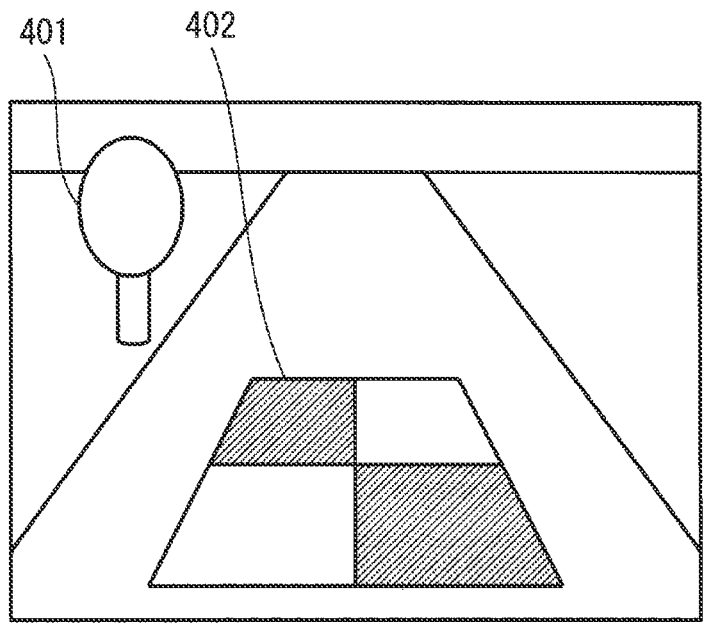
(B) BIRD'S EYE VIEW IMAGE 71
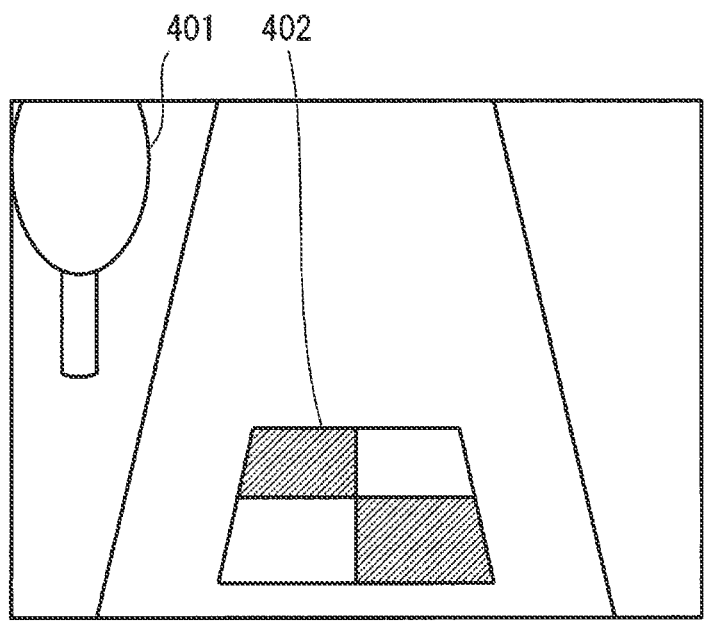

| CORRE-SPONDENCE RELATION NUMBER | DATA TABLE | | | |
|---|---|---|---|---|
| | COORDINATES ON CAPTURED IMAGE | | COORDINATES ON BIRD'S EYE VIEW IMAGE | |
| | Xr COOR-DINATES | Yr COOR-DINATES | Xv COOR-DINATES | Yv COOR-DINATES |
| 1 | xr1 | yr1 | xv1 | yv1 |
| 2 | xr2 | yr2 | xv2 | yv2 |
| 3 | xr3 | yr3 | xv3 | yv3 |
| 4 | xr4 | yr4 | xv4 | yv4 |
| ... | ... | ... | ... | ... |
| n | xrn | yrn | xvn | yvn |

FIG.6
(A)
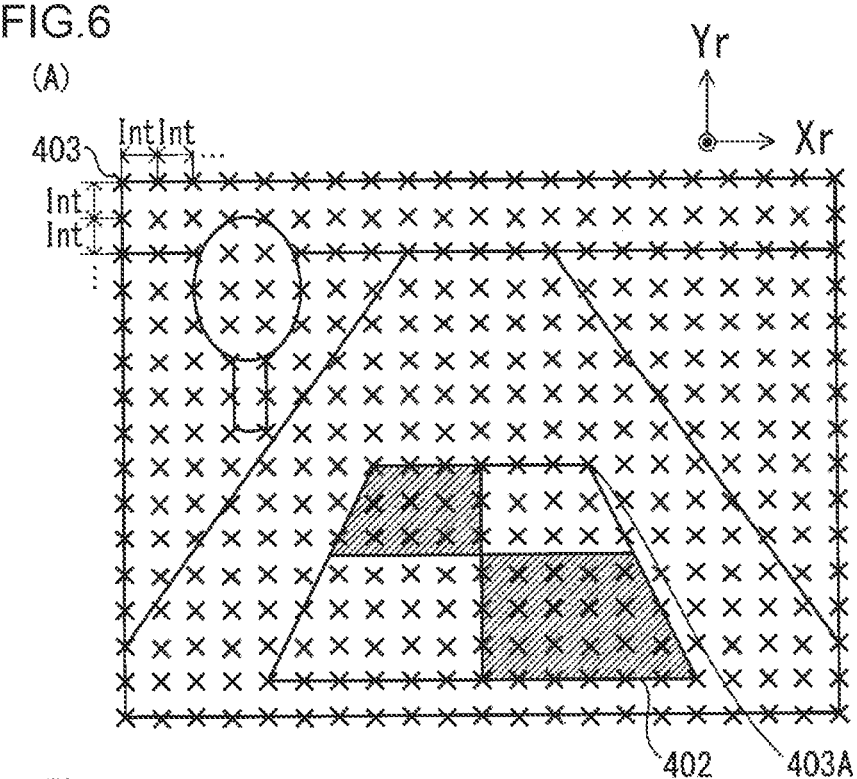
(B)
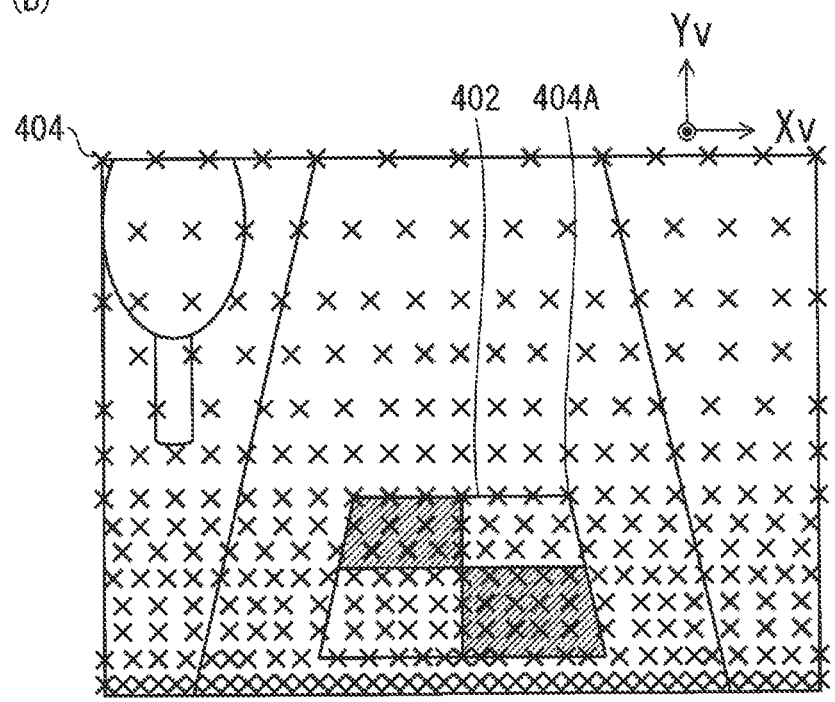

FIG.7
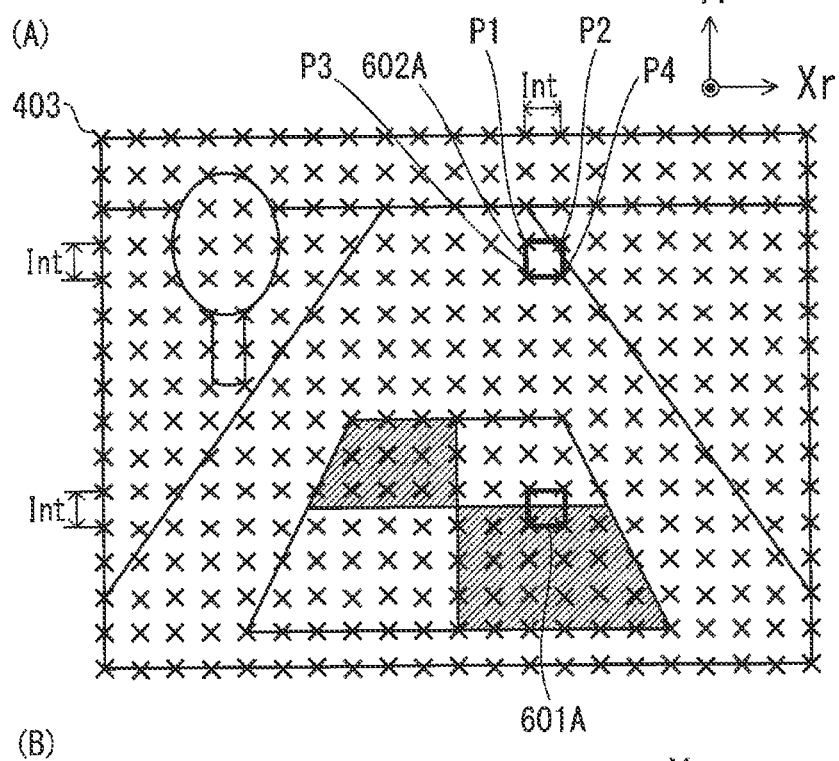
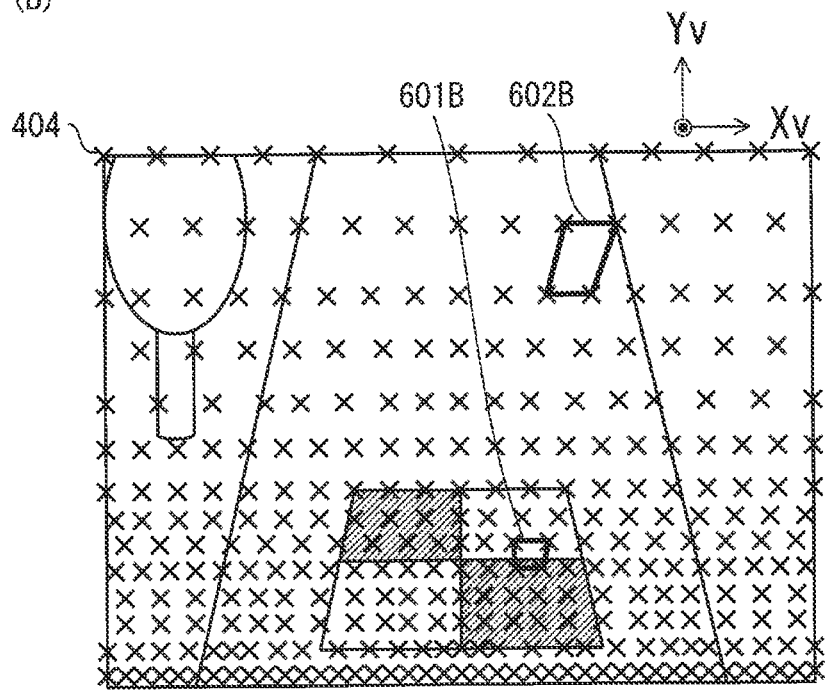

FIG.8
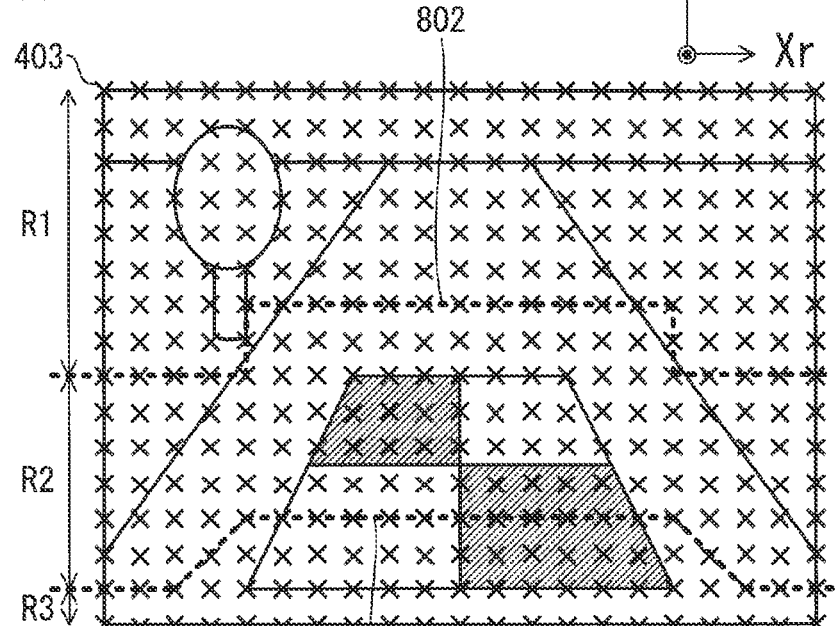
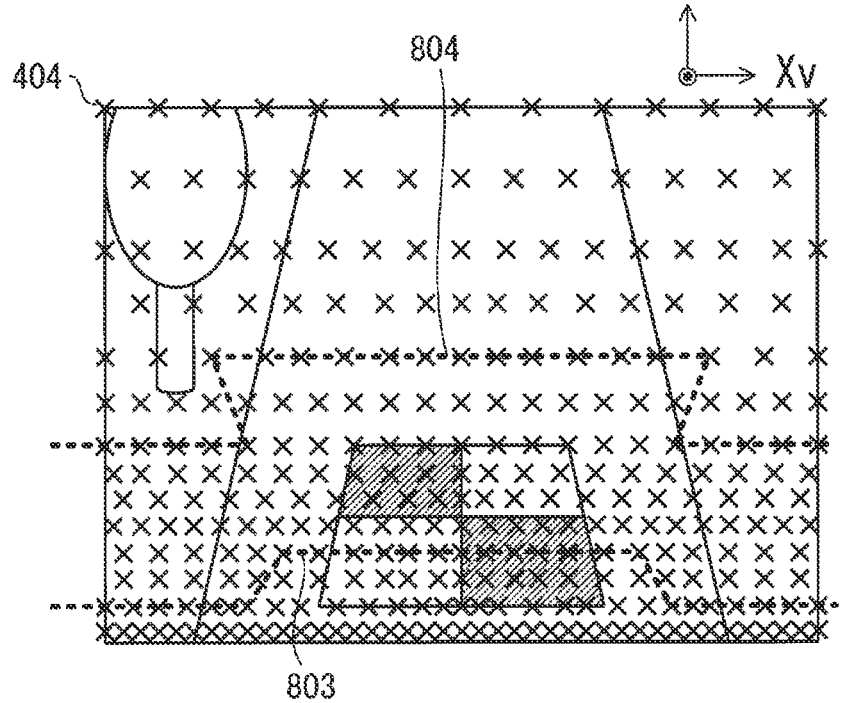

IMAGE GENERATION DEVICE, COORDINATE TRANSFORMATION TABLE CREATION DEVICE AND CREATION METHOD

TECHNICAL FIELD

The present invention relates to an image generation device, and a coordinate transformation table creation device and creation method.

BACKGROUND ART

Conventionally known is an image generation device which performs coordinate transformation, based on a coordinate transformation table, to a two-dimensional first image having a span in a horizontal direction and a vertical direction and which was acquired by overlooking and imaging an object from a first viewpoint at a first depression angle, and generates and outputs a second image which was obtained by overlooking the object from a second viewpoint which is different from the first viewpoint at a second depression angle which is different from the first depression angle (PTL 1).

CITATION LIST

Patent Literature

[PTL 1] Japanese Laid-Open Patent Publication No. 2005-333442

SUMMARY OF THE INVENTION

Technical Problem

With the conventional technology, a plurality of first pixels constituting a first image are arranged at a predetermined pitch in a horizontal direction and a vertical direction across the entire area of the screen region. An image captured with a camera mounted at the rear of a vehicle is transformed into a bird's eye view image which views the road surface from a position that is higher than the camera. In order to accelerate the computation speed of transforming the captured image into a bird's eye view image, a coordinate transformation table is used. A coordinate transformation table transforms the coordinates of a plurality of selected pixels which were discretely selected among a plurality of first pixels constituting the captured image into the coordinates of second pixels constituting the bird's eye view image. With the bird's eye view image created with this coordinate transformation table, the distortion level will increase as the region is farther from the vehicle. Thus, upon creating a coordinate transformation table, a tolerable distortion level from the perspective of visibility is set, and selected pixels are set based on the distortion level of the image of a region that is far from the vehicle. Consequently, there is a problem in that the data volume of the coordinate transformation table will increase.

Solution to Problem (1) According to the 1st aspect of the present invention, in an image generation device which performs coordinate transformation, based on a coordinate transformation table, to a two-dimensional first image having a span in a horizontal direction and a vertical direction and acquired by overlooking and imaging an object from a first viewpoint at a first depression angle, and generates and outputs a second image which was obtained by overlooking the object from a second viewpoint which is different from the first viewpoint at a second depression angle which is different from the first depression angle: the coordinate transformation table is a table for transforming coordinates of a plurality of first selected pixels selected from a plurality of first pixels constituting the first image into coordinates of second selected pixels corresponding to a plurality of second pixels constituting the second image; and the first selected pixels of the coordinate transformation table is set so that, when a region of the first image is divided into a plurality of regions in the vertical direction based on at least one pixel boundary line extending in the horizontal direction, an array pitch of the first selected pixels in a region on a lower side in the vertical direction of the first image becomes rougher than an array pitch of the first selected pixels in a region on an upper side in the vertical direction of the first image.

(2) According to the 2nd aspect of the present invention, a coordinate transformation table creation device in the image generation device according to the 1st aspect, comprises: a storage unit which stores an initial coordinate transformation table for performing coordinate transformation to a two-dimensional first image having a span in a horizontal direction and a vertical direction and acquired by overlooking and imaging an object from a first viewpoint at a first depression angle, and generating a second image which was obtained by overlooking the object from a second viewpoint which is different from the first viewpoint at a second depression angle which is different from the first depression angle; an image input unit which inputs the first image; an image transformation unit which transforms the input first image into the second image based on the initial coordinate transformation table; a computing unit which computes a ratio of an area of a first texture formed from three or more first pixels and an area of a second texture formed from three or more second pixels with regard to the first image and the second image before and after the image transformation; and a creation unit which creates a coordinate transformation table by selecting a predetermined number of first pixels from a plurality of first pixels of the initial coordinate transformation table so that an array pitch of second pixels becomes rougher as an area ratio of the second texture relative to the first texture is smaller in accordance with the computed area ratio.

(3) According to the 3rd aspect of the present invention, a coordinate transformation table creation method in the image generation device according to the 1st aspect, comprises: inputting a first image; reading an initial coordinate transformation table for performing coordinate transformation to a two-dimensional first image having a span in a horizontal direction and a vertical direction and acquired by overlooking and imaging an object from a first viewpoint at a first depression angle, and generating a second image which was obtained by overlooking the object from a second viewpoint which is different from the first viewpoint at a second depression angle which is different from the first depression angle; transforming the input first image into the second image based on the initial coordinate transformation table; computing a ratio of an area of a first texture formed from three or more first pixels and an area of a second texture formed from three or more second pixels with regard to the first image and the second image before and after the image transformation; and creating a coordinate transformation table by selecting a predetermined number of first pixels from a plurality of first pixels of the initial coordinate transformation table so that an array pitch of the second pixels becomes rougher as an area ratio of the second texture relative to the first texture is smaller in accordance with the computed area ratio.

Advantageous Effects of Invention

According to the present invention, it is possible to reduce the data volume of a correspondence table which transforms coordinates of an input image into a different image.

BRIEF DESCRIPTION OF DRAWINGS

FIG. 1 is a diagram showing an example of a vehicle periphery monitoring system using the image generation device according to an embodiment of the present invention.

FIG. 2(A) is a diagram showing an example of an image acquired from a camera, and FIG. 2(B) is a diagram showing an example of a bird's eye view image created using the image acquired from the camera.

FIG. 4 is a block diagram showing an example of a data table related to coordinate corresponding information.

FIGS. 6(A) and (B) are diagrams showing an example of the pixels in which coordinate corresponding information is stored in the data table; that is, an example of the coordinate corresponding points.

FIGS. 7(A) and (B) are diagrams showing an example of a texture.

FIG. 8(A) is a diagram showing a divided example of the captured image based on a boundary line, and FIG. 8(B) is a diagram showing a divided example of the bird's eye view image based on a boundary line.

DESCRIPTION OF EMBODIMENTS

Figure 3:
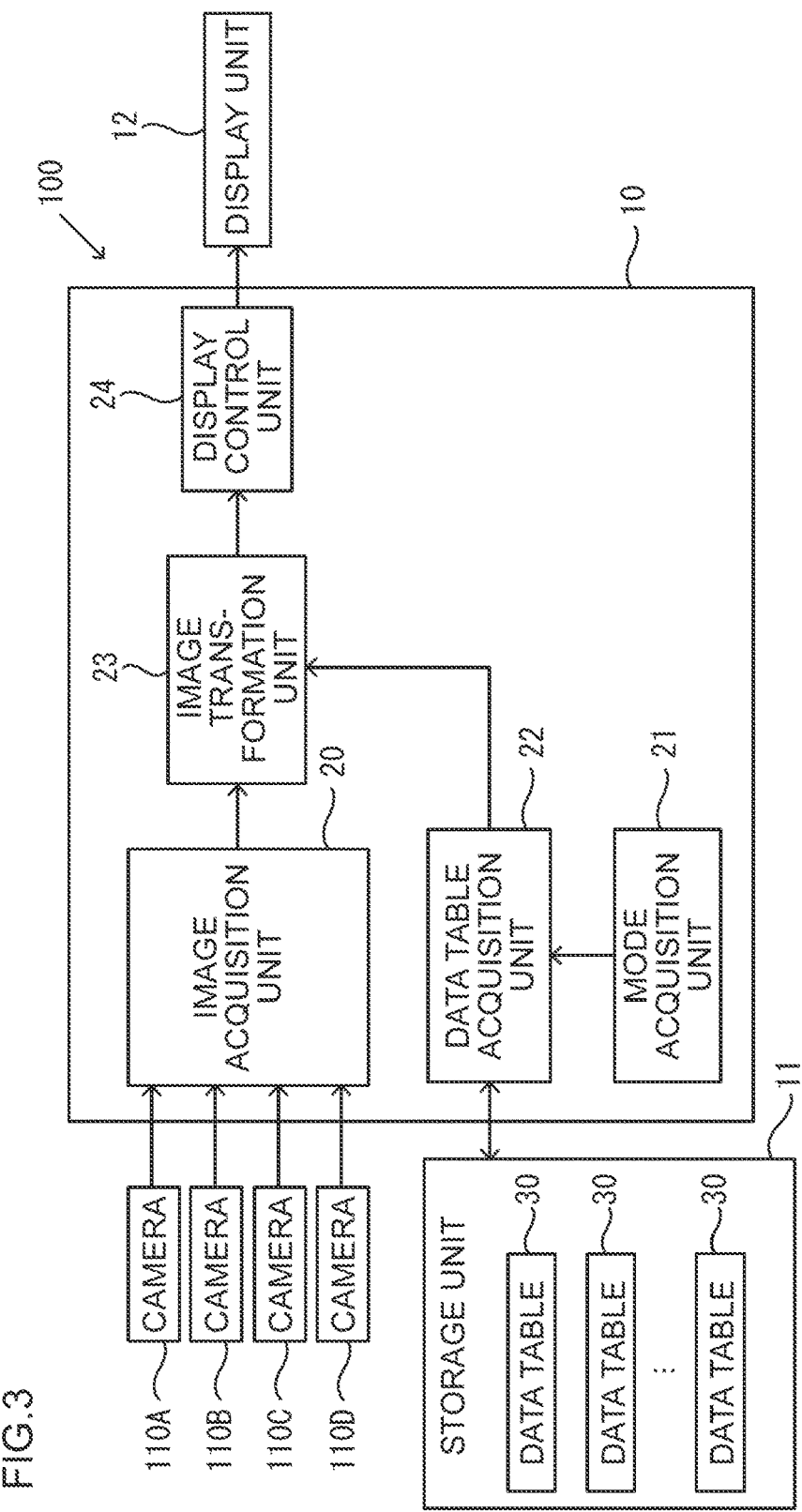
FIG. 3 is a block diagram of an image generation device according to an embodiment of the present invention.

FIG. 1(a) and FIG. 1(b) are diagrams showing an example of a vehicle periphery monitoring system using an image generation device. The image generation device 100 illustrated in FIG. 1(a) is mounted on a vehicle 101 such as a passenger car or a work vehicle or a service vehicle. A camera 110A is mounted on the front part of the vehicle 101, and its optical axis is facing a road surface 210 which is ahead of the vehicle 101. Moreover, as illustrated in FIG. 1(b), a camera 110B, a camera 110C and a camera 110D are respectively mounted on the left part, the right part and the rear part of the vehicle, and their optical axes are facing the ground 210 around the vehicle 101. The setting positions and the setting angles of the cameras 110A to 110D are predetermined at the design stage of the periphery monitoring system.

The image generation device 100 acquires images of the ambient environment of the vehicle 101 captured by the respective cameras 110A to 110D, and uses these images to generate images of the periphery of the vehicle 101 as a bird's eye view or an overhead view from a predetermined virtual viewpoint. The position and the depression angle of the virtual viewpoint are predetermined at the design stage of the periphery monitoring system, and prepared for each mode of the vehicle 101. A "depression angle" is the angle of viewing from a virtual viewpoint, as a bird's eye view or an overhead view, the plane direction that the vehicle is traveling.

For instance, a parking mode is selected when parking the vehicle 101, and an overhead view image that is equivalent to an image which captures the vehicle from the position of a virtual viewpoint 310B at a predetermined depression angle is created. A driving mode is selected when driving the vehicle 101 on the road, and a bird's eye view image that is equivalent to an image which captures the vehicle from the position of a virtual viewpoint 310A at a predetermined depression angle is created.

In the ensuing explanation, as an example of the image synthesis of the image generation device 100, a case of synthesizing a bird's eye view image which overlooks the front of the vehicle 101 from the virtual viewpoint 310A by using the images acquired from the cameras 110A to 110C is explained.

The camera 110A is configured, for instance, from a wide-angle camera such as a fish-eye camera, and captures an image of the front environment of the vehicle 101 including a standing tree 401 which exists in front of the vehicle 101 and a marker 402 disposed on the ground 210 in front of the vehicle 101. An example of the image acquired from the camera 110A is shown in FIG. 2(A). FIG. 2(B) is an image generated by using the image 70 illustrated in FIG. 2(A), and is a diagram showing an example of the bird's eye view image overlooking the front of the vehicle 101 from the virtual viewpoint 310A. In the ensuing explanation, an image acquired by the image generation device 100 from the camera 110A is referred to as a "captured image". Moreover, an image overlooking the periphery of the vehicle 101 from the virtual viewpoint 310A generated by the image generation device 100 is hereinafter referred to as the bird's eye view image.

Note that the images of the lower left part and the lower right part of the bird's eye view image 71 of FIG. 2(B) are created by using a part of the images acquired from the cameras 110B and 110C. A region in which an object region captured by the camera 110A and an object region captured by the camera 110B overlap is synthesized, for instance, by a blending the images acquired from the two cameras 110A and 110B.

FIG. 3 is a block diagram of the image generation device 100. The image generation device 100 comprises a control unit 10 configured from a CPU or the like, and a storage unit 11 configured from a flash memory, a ROM or the like. The control unit 10 functions as an image acquisition unit 20, a mode acquisition unit 21, a data table acquisition unit 22, an image transformation unit 23 and a display control unit 24 by executing the programs stored in the storage unit 11. The storage unit 11 stores a data table 30, which is described in detail later, in addition to the programs (not shown) to be executed by the control unit 10. The data table 30 is a look-up table that is used when generating an overlooking image such as a bird's eye view image, and is created in advance for each mode; that is, for each combination of position and angle of the virtual viewpoints, at the design stage of the periphery monitoring system.

The image acquisition unit 20 acquires images from the cameras 110A to 110D.

The mode acquisition unit 21 acquires information related to the modes of the vehicle 101 via a CAN (not shown), and outputs the acquired information to the data table acquisition unit 22.

The data table acquisition unit 22 acquires, from the storage unit 11, the data table 30 corresponding to the mode for each mode of the vehicle 101 acquired by the mode acquisition unit 21. In other words, a plurality of data tables 30 are provided for respective modes.

The image transformation unit 23 generates the bird's eye view image 71 by using the captured image 70 acquired by the image acquisition unit 20, and the data table 30 acquired by the data table acquisition unit 22.

The display control unit 24 outputs the bird's eye view image 71 generated by the image transformation unit 23 to the display unit 12. As the display unit 12, for instance, a display unit of a car navigation system mounted on the vehicle 101 may be used.

FIG. 4 is a diagram showing an example of the data table 30. The data table 30 is a coordinate corresponding table which defines the correspondence relation of the coordinates of discrete pixels of the captured image 70 and the coordinates of the pixels of the bird's eye view image 71 corresponding to the foregoing coordinates. FIG. 4 shows coordinate corresponding information of the respective pixels of correspondence relation numbers 1, 2, . . . n. The image generation device 100 refers to the data table 30 of FIG. 4 for each of the coordinates of the respective pixels of the captured image 70, and computes the coordinates of the pixels of the corresponding bird's eye view image 71. The coordinate corresponding information is now explained in detail. Note that, in order to simplify the explanation, the captured image 70 is explained as the image that was acquired by being captured by the camera 110A.

Figure 5:
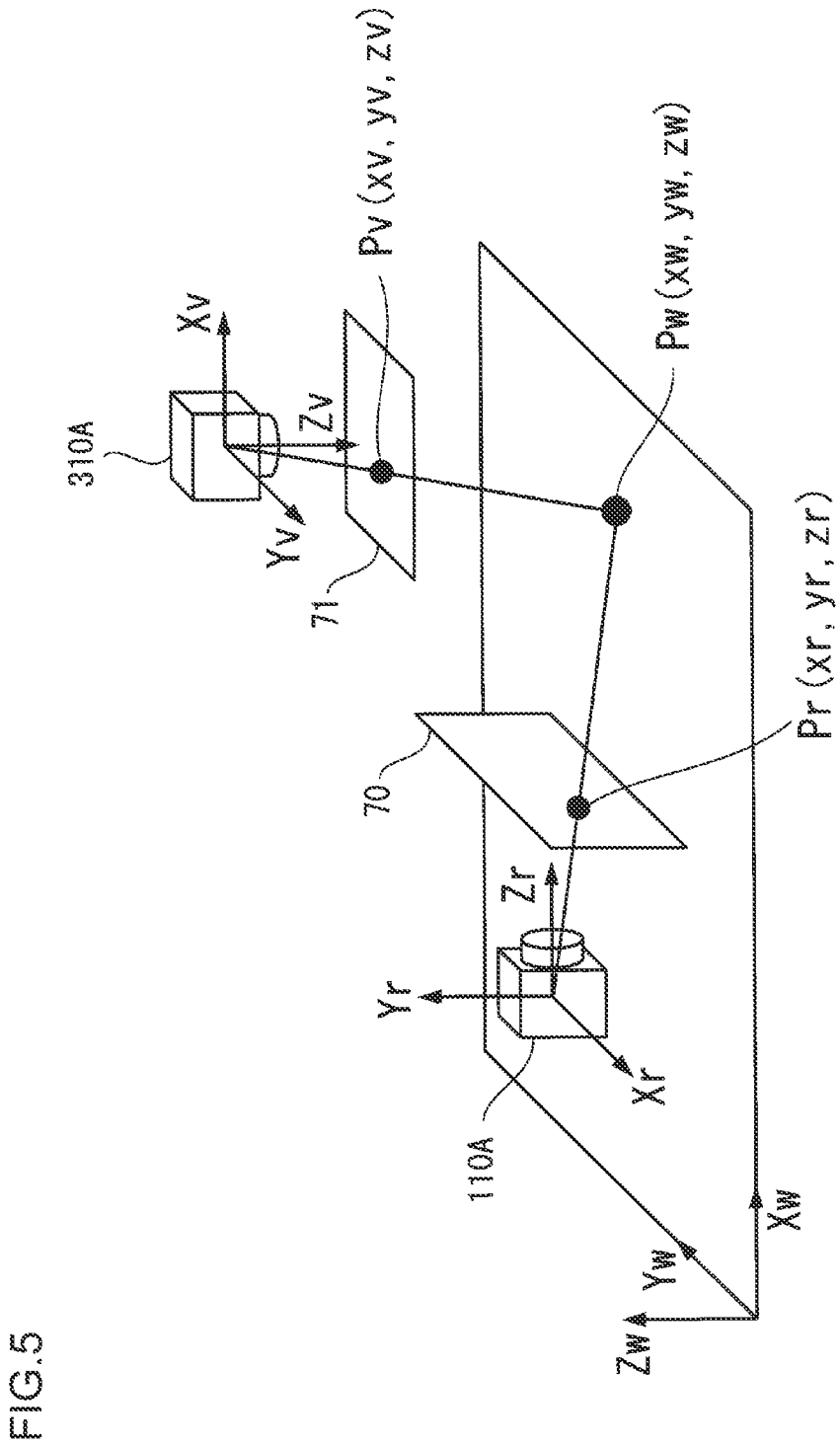
FIG. 5 is a diagram explaining the coordinate transformation process.

FIG. 5 illustrates three coordinate systems; specifically, a camera coordinate system Xr, Yr, Zr of the camera 110A, a virtual viewpoint coordinate system Xv, Yv, Zv of the virtual viewpoint 310, and a World coordinate system Xw, Yw, Zw.

The World coordinate system is a coordinate system related to the road surface on which the vehicle will travel.

The camera coordinate system is a coordinate system which defines the position of the respective pixels constituting the captured image 70 on a plane that is parallel to the imaging plane of the image sensor of the camera 110A mounted on the vehicle, and which is a plane that is separated from the camera 110A at a predetermined distance in the Zr axis direction. In other words, the position of the respective pixels constituting the captured image 70 is expressed as the coordinates data on the XrYr plane positioned at Zr=zr.

The virtual viewpoint coordinate system is a coordinate system which defines the position of the respective pixels constituting the bird's eye view image 71 on a plane that is parallel to the imaging plane of the image sensor virtually disposed on the virtual viewpoint 310A, and which is a plane that is separated from the virtual viewpoint 310A at a predetermined distance in the Zv axis direction. In other words, the position of the respective pixels constituting the bird's eye view image 71 is expressed as the coordinates data on the XvYv plane positioned at Zv=zv.

One pixel of the World coordinate system Xw, Yw, Zw is used as a point Pw, and the coordinates of the point Pw are represented as (xw, yw, zw). The pixel of the camera coordinate system Xr, Yr, Zr corresponding to the point Pw of the World coordinate system is the Point Pr in FIG. 5, and the coordinates of the point Pr are represented as (xr, yr, zr). The pixel of the virtual viewpoint coordinate system Xv, Yv, Zv corresponding to the point Pw of the World coordinate system is the point Pv in FIG. 5, and the coordinates of the point Pv are represented as (xv, yv, zv). The data table 30 of FIG. 4 defines the correspondence relation of these points; that is, the correspondence relation of the pixels of the camera coordinate system and the virtual viewpoint coordinate system. Note that, in the data table 30 of FIG. 4, information of the Zr coordinates is omitted on grounds that the focal distance of the camera 110A is fixed.

In order to transform (or convert) the coordinates (xw, yw, zw) of the point Pw of the World coordinate system Xw, Yw, Zw into the coordinates (xr, yr, zr) of the point Pr of the camera coordinate system Xr, Yr, Zr, for instance, the affine transformation as shown in mathematical formula (1) is used. Here, Mr is the 4×4 perspective projection transformation (or conversion) matrix as shown in mathematical formula (2). In mathematical formula (2), Rr is the 3×3 rotating matrix, Tr is the 1×3 translation matrix, and 0 is the 3×1 zero matrix. The rotating matrix Rr and the translation matrix Tr are calculated according to known methods based on the setting position and the setting angle of the camera 110A on the World coordinate system, the focal distance as the internal parameters of the camera 110A, and the effective pixel size of the image sensor.

[Math 1]

$$\begin{bmatrix} x_r \\ y_r \\ z_r \\ 1 \end{bmatrix} = M_r \begin{bmatrix} x_w \\ y_w \\ z_w \\ 1 \end{bmatrix} \quad (1)$$

[Math 2]

$$M_r = \begin{bmatrix} R_r & T_r \\ 0 & 1 \end{bmatrix} \quad (2)$$

Moreover, in order to transform the coordinates (xw, yw, zw) of the point Pw of the World coordinate system Xw, Yw, Zw into the coordinates (xv, yv, zv) of the point Pv of the virtual viewpoint coordinate system Xv, Yv, Zv, for instance, the affine transformation as shown in mathematical formula (3) is used. Here, Mv is the 4×4 perspective projection transformation matrix as shown in mathematical formula (4). In mathematical formula (4), Rv is the 3×3 rotating matrix, Tv is the 1×3 translation matrix, and 0 is the 3×1 zero matrix. The rotating matrix Rv and the translation matrix Tv are calculated according to known methods based on the position and the angle of the virtual viewpoint 310 on the World coordinate system, the virtual focal distance of the virtual viewpoint 310, and the effective pixel size of the image sensor.

[Math 3]

$$\begin{bmatrix} x_v \\ y_v \\ z_v \\ 1 \end{bmatrix} = M_v \begin{bmatrix} x_w \\ y_w \\ z_w \\ 1 \end{bmatrix} \quad (3)$$

-continued

[Math 4]
$$M_v = \begin{bmatrix} R_v & T_v \\ 0 & 1 \end{bmatrix} \quad (4)$$

When the foregoing mathematical formula (1) and mathematical formula (3) are combined, obtained is mathematical formula (5) for transforming the coordinates of the point Pr of the camera coordinate system Xr, Yr, Zr into the coordinates of the point Pv of the virtual viewpoint coordinate system Xv, Yv, Zv. In mathematical formula (5), the coordinates of the point Pr of the camera coordinate system Xr, Yr, Zr are transformed into the coordinates of the point Pw of the World coordinate system based on the inverse matrix of the perspective projection transformation matrix Mr, and the coordinates of the point Pw are transformed into the coordinates (xv, yv, zv) of the point Pv of the virtual viewpoint coordinate system Xv, Yv, Zv based on the perspective projection transformation matrix Mv. By using the coordinate transformation results of mathematical formula (5), the pixel value of the point Pv of the bird's eye view image 71 can be calculated from the pixel value of the point Pr of the corresponding captured image 70.

[Math 5]
$$\begin{bmatrix} x_v \\ y_v \\ z_v \\ 1 \end{bmatrix} = M_v M_r^{-1} \begin{bmatrix} x_r \\ y_r \\ z_r \\ 1 \end{bmatrix} \quad (5)$$

The data table 30 represents the results of transforming (or converting) the coordinates (xr1, yr1) of a predetermined point Pr1, the coordinates (xr2, yr2) of a predetermined point Pr2, . . . of the camera coordinate system Xr, Yr, Zr into the coordinates of corresponding points of the virtual viewpoint coordinate system Xv, Yv, Zv in foregoing mathematical formula (5), respectively. Here, the corresponding points in the two coordinate systems; that is, the correspondence relation of the pixels, is hereinafter referred to as the "coordinate corresponding information", and this information is created as the data table 30 of FIG. 4. By storing the data table 30 in the storage unit 11 in advance and referring to the data table 30 upon creating the bird's eye view image 71, the number of computations performed in mathematical formula (5) can be reduced, and the processing time of coordinate transformation (or conversion) can be shortened. Note that the data table 30 illustrated in FIG. 4 only shows the correspondence relation of the coordinates, and the values of the respective pixels; that is, the pixel values, are not shown.

The data volume of the data table 30 will increase as the amount of coordinate corresponding information to be stored in the data table 30 in advance increases. In order to reduce the data volume of the data table 30, coordinate corresponding information regarding only a part of the pixels of the captured image 70 is stored in advance, and, with regard to the other pixels, the pixel values of the point Pv are calculated based on interpolation processing. In the ensuing explanation, among the pixels of the captured image 70 and the bird's eye view image 71, the pixels in which the coordinate corresponding information is stored in the data table 30 are hereinafter referred to as the "coordinate corresponding pixels" or the "coordinate corresponding points".

The data table 30 stored in the storage unit of the conventional image generation device is now explained.

FIG. 6(A) and FIG. 6(B) are diagrams showing an example of the coordinate corresponding points in which coordinate corresponding information is stored in the conventional data table 30. In FIG. 6(A), a plurality of coordinate corresponding points 403 are disposed at predetermined intervals Int on the captured image 70. The predetermined intervals Int are, for instance, 4 pixels. FIG. 6(B) is a diagram illustrating a plurality of coordinate corresponding points 404 of the bird's eye view image 71 which respectively correspond to the plurality of coordinate corresponding points 403 illustrated in FIG. 6(A). For instance, the coordinate corresponding point 403A positioned near the upper right corner of the marker 402 in FIG. 6(A) correspond to the coordinate corresponding point 404A positioned near the upper right corner of the marker 402 in FIG. 6(B).

Due to the difference in the depression angle of the camera 110A and the virtual viewpoint 310A, in FIG. 6(B), the intervals of the coordinate corresponding points 404 in the Yv axis direction are not equal intervals. The intervals of the coordinate corresponding points 404 become larger from the lower part to the upper part of the bird's eye view image 70 of FIG. 6(B). To put it differently, the density of the coordinate corresponding points 404 becomes lower from the lower part to the upper part of the bird's eye view image 70 of FIG. 6(B). When interpolation processing is performed, the distortion of the image increases as the density of the coordinate corresponding points 404 is lower. The predetermined intervals Int of the coordinate corresponding points 403 are set so that the distortion will be sufficiently small, to a level that the user will not feel any unpleasant sensation, even at the upper part of the bird's eye view image 70 where the density of the coordinate corresponding points 404 is low. Here, the coordinate corresponding points 404 exist excessively at the lower part of the bird's eye view image 70 where the density of the coordinate corresponding points 404 is high. In other words, the amount of data table becomes extremely great, and improvement in the memory efficiency is desired.

The data volume of the data table 30 stored in the storage unit 11 of the image generation device 100 according to this embodiment can be reduced by reducing (or subsampling) the coordinate corresponding points 404 at the lower part of the bird's eye view image 70 so that the coordinate corresponding points 404 do not exist excessively; that is, by reducing the number of pixel corresponding points so that the density of the coordinate corresponding points 404 does not increase. The method of creating the data table 30 stored in the storage unit 11 of the image generation device 100 according to this embodiment is now explained.

Figure 13:
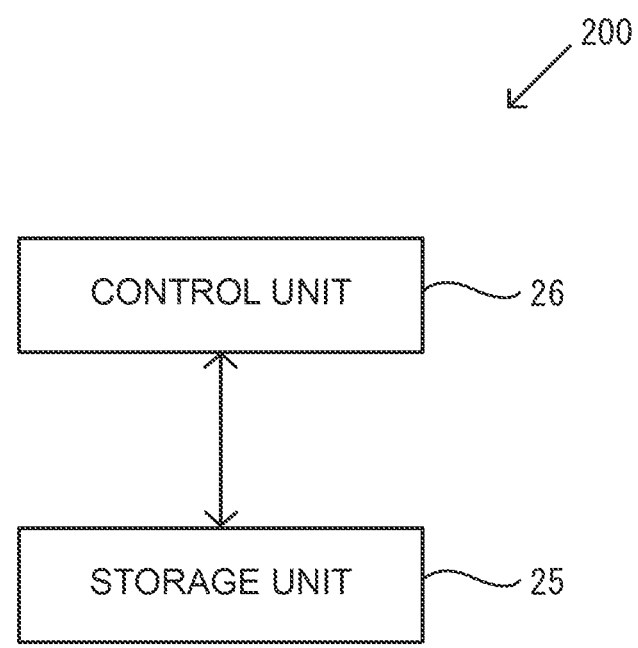
FIG. 13 is a block diagram of the coordinate transformation table creation device according to an embodiment of the present invention.

In this embodiment, the data table 30 is created by a table creation device, such as the designer's PC, at the design stage of the image generation device 100. FIG. 13 is a block diagram of the table creation device 200 according to an embodiment of the present invention. The table creation device 200 comprises a storage unit 25 configured from a hard disk, a flash memory, a RAM, a ROM or the like, and a control unit 26 configured from a CPU or the like. The control unit 26 creates the data table 30 by executing the data creation program stored in the storage unit 25.

With the method of creating the data table 30 according to this embodiment, the coordinate corresponding points 403 illustrated in FIG. 6(A) are temporarily set as with conventional methods, and the coordinate corresponding points 404 corresponding to the coordinate corresponding points 403 are calculated by using the foregoing mathematical formula (5).

As shown in FIG. 7(A), four coordinate corresponding points 403 are used as vertexes, and squares 601A, 602A in which one side becomes the interval Int of the coordinate corresponding points 403 are set. In this embodiment, the thus set squares are referred to as "textures". For instance, FIG. 7(A) illustrates, as an example of the textures, a texture 601A positioned at the lower part of the captured image 70 and a texture 602A positioned at the upper part of the captured image 70.

The points in which the four coordinate corresponding points 403 constituting the texture 601A were subject to coordinate transformation (or conversion) are the four coordinate corresponding points 404, and a quadrangle 601B is formed by the four coordinate corresponding points 404. The area of the quadrangle 601B is smaller than the texture 601A. Meanwhile, the points in which the four coordinate corresponding points 403 constituting the texture 602A were subject to coordinate transformation are the four coordinate corresponding points 404, and a quadrangle 602B is formed by the four coordinate corresponding points 404. The area of the quadrangle 602B is larger than the texture 602A, and distorted. Note that, in the ensuing explanation, a quadrangle formed with the coordinate corresponding points 404 corresponding to the respective vertexes of the texture is referred to as the "corresponding texture".

In this embodiment, the distortion level of the quadrangle 602A that is distorted at the same level as the quadrangle 602B is referred to as the "tolerated distortion level", and this is set as the distortion level threshold value. Furthermore, the reduction is performed at the lower region of the captured image 70 so that the maximum value of the distortion level of the quadrangle 601A of the lower region of the captured image 70, due to the image transformation, will be within the distortion level threshold value. Consequently, the amount of data is reduced while suppressing the distortion of the bird's eye view image 71 to be within a tolerable range.

As described above, with regard to the pixels of the bird's eye view image 71 in which coordinate corresponding information is not stored in the data table 30, the pixel values are determined based on interpolation processing using the pixel values of the peripheral coordinate corresponding points 404. The distortion level of the image generated based on interpolation processing becomes smaller as the ratio m (=S2/S1) of an area S2 of the corresponding texture relative to an area S1 of the texture becomes smaller. As with the corresponding texture 601B, in an image region where the area is smaller than the texture 601A, the distortion of the image is sometimes reduced to a sub pixel level. In this embodiment, a part of the coordinate corresponding points 403 and the coordinate corresponding points 404 constituting the texture and the corresponding texture is reduced according to the area ratio m; that is, in a region where the area ratio is smaller than a predetermined threshold value and the distortion level is a predetermined tolerance or less. In other words, with the foregoing tolerance as the upper limit, a distortion level that is greater than the distortion level obtained based on original coordinate transformation is set.

To what extent data should be reduced can be determined as follows.

As the design specification, the tolerated distortion level of the overall image is set, and the distortion level of the image of a region where the reduction is not performed and the distortion level of the image of a region where the reduction was performed are caused to be roughly equal. To put it differently, in a region where the area ratio is smaller than a predetermined threshold value, the number of corresponding points is reduced to attain the tolerated distortion level. Based on this kind of reduction processing, it is possible to provide an image generation device 100 in which the data volume of the data table 30 is reduced while maintaining the image quality of the bird's eye view image 71.

The textures are created in all regions of the captured image 70 by using all of the coordinate corresponding points 403 that were temporarily set. For instance, textures of the following four coordinate corresponding points P1 to P4 are created regarding all coordinate corresponding points (xr, yr) of the captured image 70. An example of the coordinate corresponding points P1 to P4 is shown in FIG. 7(A). Note that a texture is not created regarding the coordinate corresponding points (xr, yr) in which at least one among the coordinate corresponding points P2 to P4 runs over to the outside of the captured image 70.

Coordinate corresponding point P1: (xr, yr)
Coordinate corresponding point P2: (xr+Int, yr)
Coordinate corresponding point P3: (xr, yr+Int)
Coordinate corresponding point P4: (xr+Int, yr+Int)

In the ensuing explanation, a texture created on the captured image 70 will be indicated as Tr(i). i represents an integer from 1 to the total number of textures. Moreover, the corresponding texture which corresponds to the texture Tr(i) is indicated as Tv(i).

When all textures Tr(i) are created on the captured image 70, the area ratio m(i) of the texture Tr(i) and the corresponding texture Tv(i) is calculated respectively for all of the textures Tr(i). The area S1(i) of the texture Tr(i) is calculated, for instance, by calculating the length of the sides of the square from the coordinates of the respective coordinate corresponding points 403 constituting the texture, and using the formula of the area of the square. The area S2(i) of the corresponding texture Tv(i) is calculated, for instance, by calculating the length of the four sides and the diagonal line of at least one side of the quadrangle from the coordinates of the respective coordinate corresponding points 404 constituting the corresponding texture Tv(i), calculating the sum of the opposing corners, and using the formula of the area of the quadrangle. The area ratio m(i) is calculated by diving the area S2(i) of the corresponding texture by the area S1(i) of the texture Tr(i).

When the area ratio m(i) is calculated for each texture Tr(i), the captured image 70 is divided into a plurality of regions by using the area ratios m(i). FIG. 8(A) shows a divided example of the captured image 70. In FIG. 8(A), the captured image 70 is divided into the following three regions based on boundary lines 801 and 802.

Divided region R1: Configured from a texture in which the area ratio m(i) is 1 or more.
Divided region R2: Configured from a texture in which the area ratio m(i) is ½ or more and less than 1.
Divided region R3: Configured from a texture in which the area ratio m(i) is less than ½.

The boundary line 801 represents a boundary of a region in which the area ratio m(i) is ½ or more and a region in which the area ratio m(i) is less than ½, and the boundary line 802 represents a boundary of a region in which the area ratio m(i) is 1 or more and a region in which the area ratio m(i) is less than 1.

FIG. 8(B) shows the results of dividing the bird's eye view image 71 in accordance with the results of dividing the captured image 70. The boundary line 803 represents a boundary of a region in which the area ratio m(i) is ½ or more and a region in which the area ratio m(i) is less than ½, and the boundary line 804 represents a boundary of a region in which the area ratio m(i) is 1 or more and a region in which the area ratio m(i) is less than 1.

Figure 11:
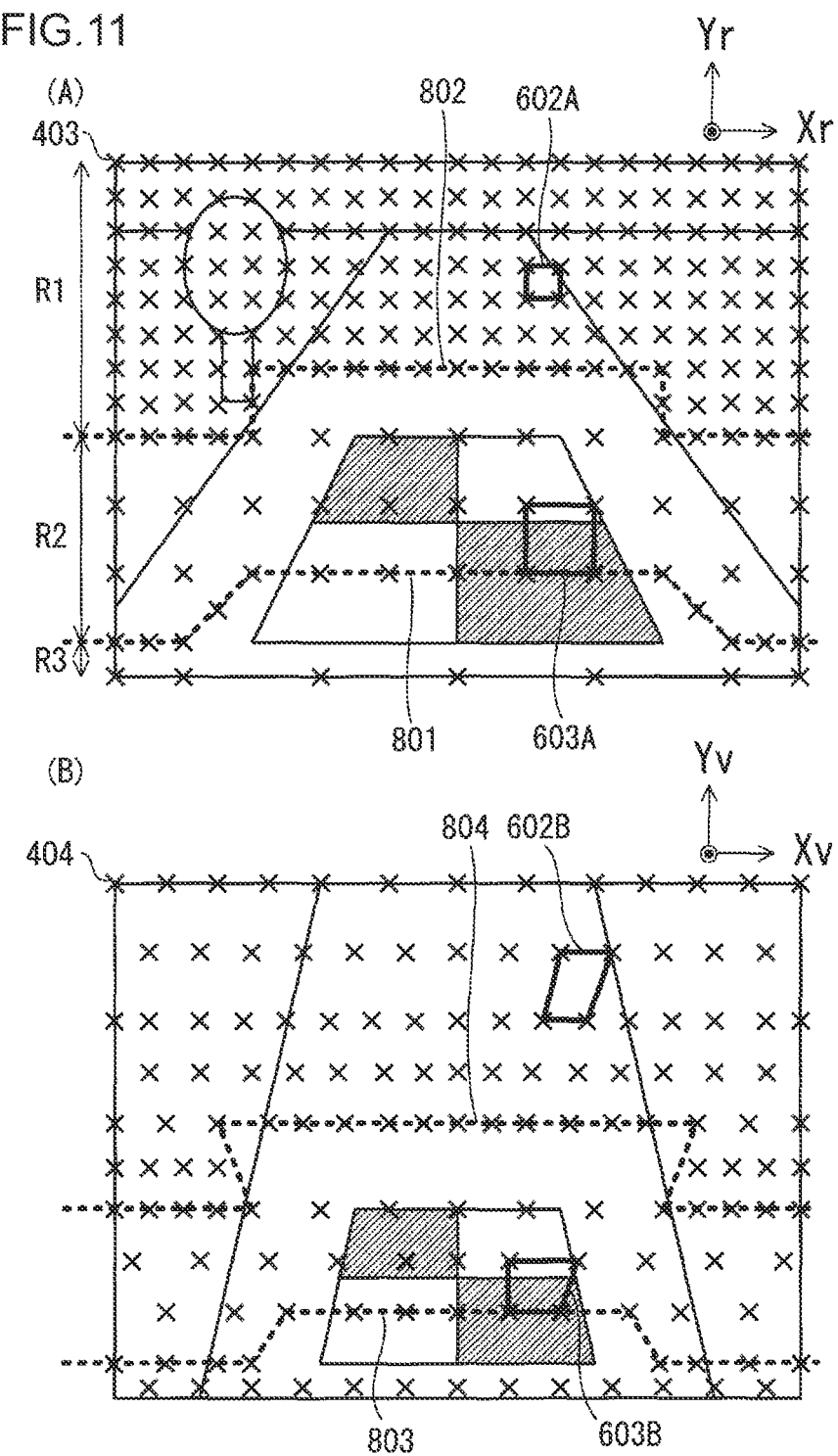
FIGS. 11(A) and (B) are diagrams showing an example of the coordinate transformation table created using the coordinate transformation table creation method according to an embodiment of the present invention.

In this embodiment, as shown in FIG. 11(A), the coordinate corresponding points 403 are reduced so that the intervals of the coordinate corresponding points 403 in the divided regions R1 to R3 correspond to the following.

Divided region R1: Interval Int at the time of temporary setting

Divided region R2: 2× the interval Int at the time of temporary setting

Divided region R3: 4× the interval Int at the time of temporary setting

Figure 9:
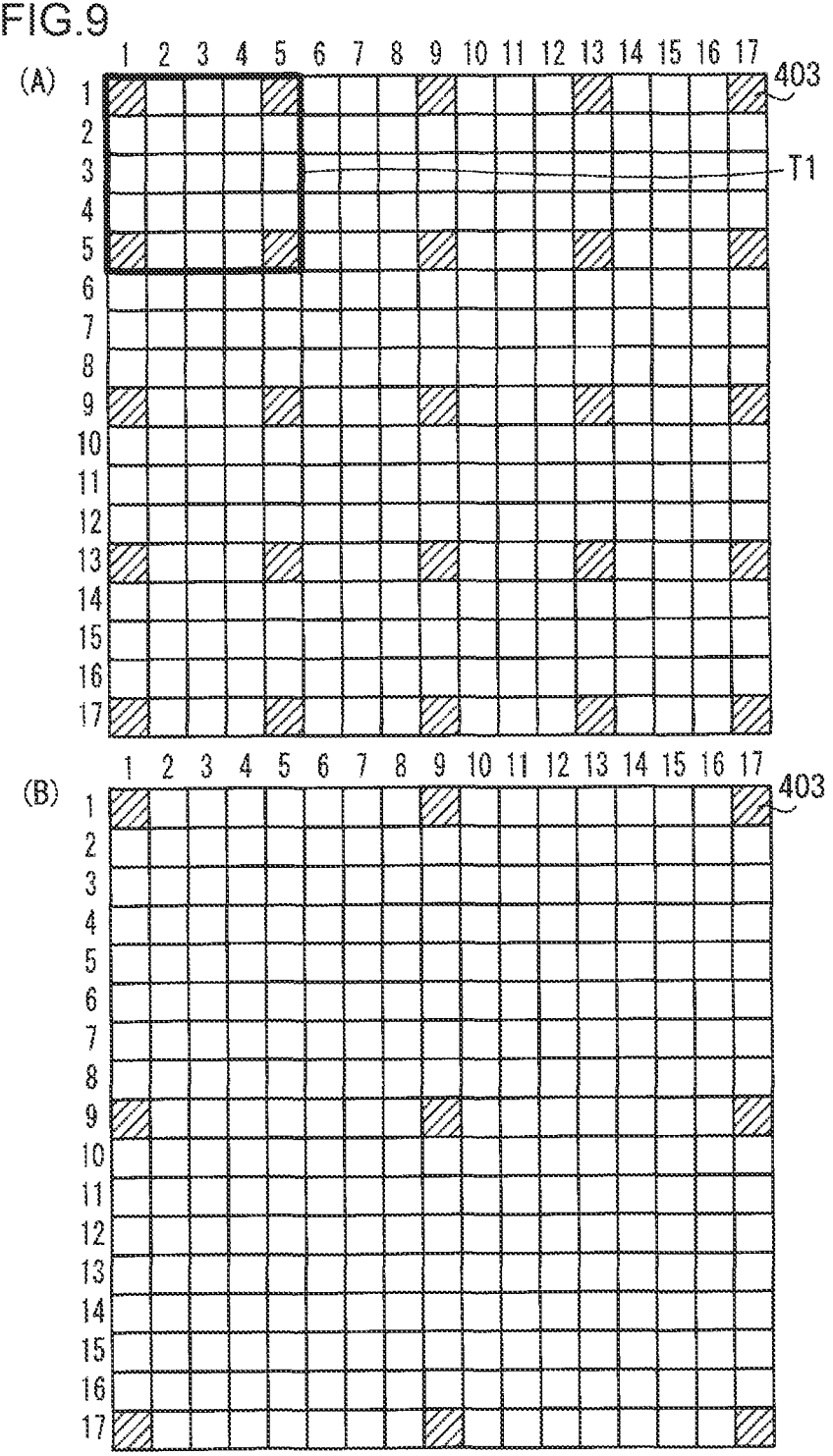
FIGS. 9(A) and (B) are diagrams explaining an example of the method of reducing the coordinate corresponding points.

An example of the method of reducing (or subsampling) the coordinate corresponding points 403 in the divided region R2 is now explained with reference to FIG. 9(A) and FIG. 9(B). FIG. 9(A) shows 17×17 pixels of the captured image 70, and the pixels of the coordinate corresponding points 403 that were temporarily set at 4 pixel intervals from the pixels (1, 1) are hatched. In the divided region R2, in order to set the intervals of the coordinate corresponding points 403 to be 2× the interval at the time of temporary setting; for instance, to 8 pixel intervals, the coordinate corresponding points 403 in which the Xr coordinates or the Yr coordinates are 5 or 13 are reduced as illustrated in FIG. 9(B). Whether or not the respective coordinate corresponding points 403 should to be reduced can be determined based on the remainder obtained by dividing the Xr coordinates and the Yr coordinates by the value of the interval that is 2× the interval at the time of temporary setting. In the example of FIG. 9(A) and FIG. 9(B), the coordinate corresponding points 403 in which either the remainder obtained by dividing the Xr coordinates by 8 or the remainder obtained by dividing the Yr coordinates by 8 is 5 are reduced. The determination of the respective coordinate corresponding points 403 to be reduced by using the remainder is performed for each texture T(i). For instance, when it is determined that the texture T1 comprising the pixels (1, 1), the pixels (1, 5), the pixels (5, 1), and the pixels (5, 5) of the coordinate corresponding points 403 is included in the divided region R2, based on the remainder, it is determined that the pixels (1, 5), the pixels (5, 1), and the pixels (5, 5) are to be reduced.

Figure 10:
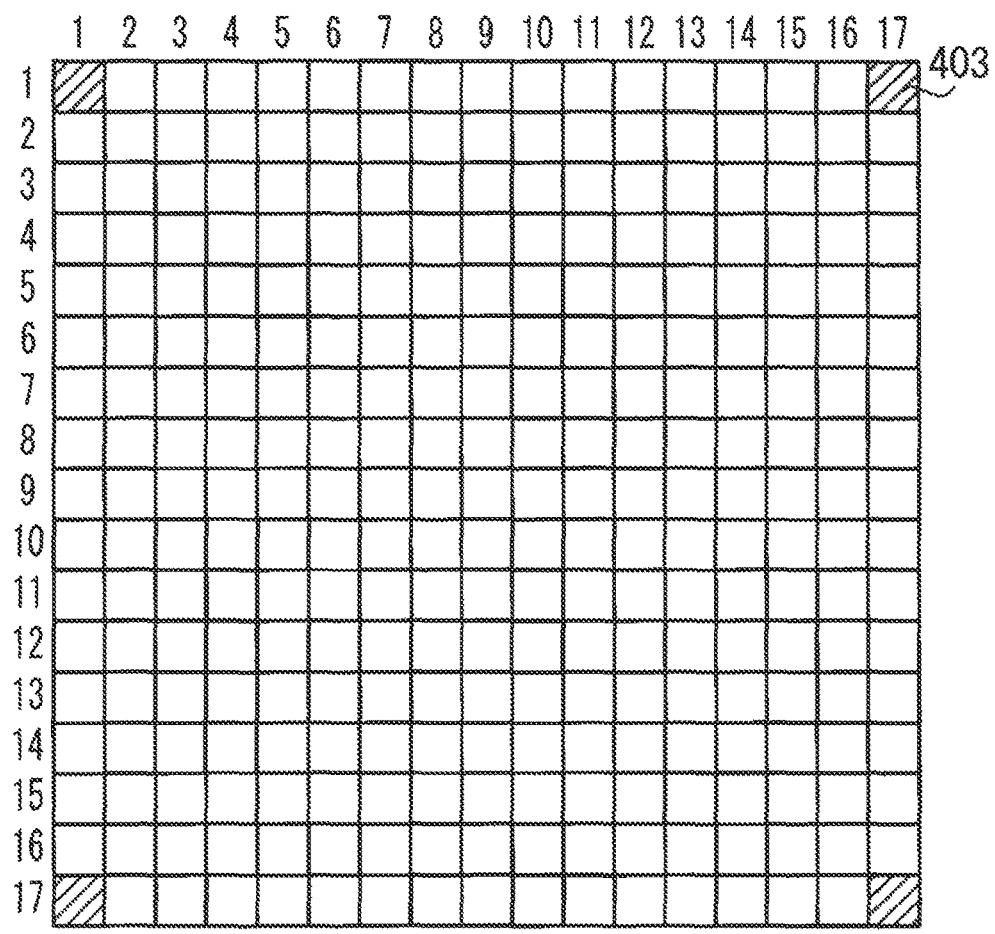
FIG. 10 is a diagram explaining an example of the method of reducing the coordinate corresponding points.

The method of reducing the coordinate corresponding points 403 in the divided region R3 is the same as the method of reducing the coordinate corresponding points 403 in the divided region R2. In the divided region R3, in order to set the intervals of the coordinate corresponding points 403 to be 4× the interval at the time of temporary setting; for instance, to 16 pixel intervals, the coordinate corresponding points 403 in which the Xr coordinates or the Yr coordinates are 5, 9, or 13 are reduced as illustrated in FIG. 10. Whether or not the respective coordinate corresponding points 403 should to be reduced can be determined based on the remainder obtained by dividing the Xr coordinates and the Yr coordinates by the value of the interval that is 4× the interval at the time of temporary setting. In the example of FIG. 9(A) and FIG. 10, the coordinate corresponding points 403 in which either the remainder obtained by dividing the Xr coordinates by 16 or the remainder obtained by dividing the Yr coordinates by 16 is not 1 are reduced. The determination of the respective coordinate corresponding points 403 to be reduced by using the remainder is performed for each texture T(i).

The coordinate corresponding points 403 that are located on the boundary line 801 are subject to the method of reducing the coordinate corresponding points 403 in the divided region R2, and the method of reducing the coordinate corresponding points 403 in the divided region R3. When the results on whether or not to reduce the coordinate corresponding points 403 differ between the two reduction methods, the method of reducing the coordinate corresponding points 403 in the divided region R2 is given preference. Similarly, the coordinate corresponding points 403 that are located on the boundary line 802 are subject to the method of reducing the coordinate corresponding points 403 in the divided region R1, and the method of reducing the coordinate corresponding points 403 in the divided region R2. When the results on whether or not to reduce the coordinate corresponding points 403 differ between the two reduction methods, the method of reducing the coordinate corresponding points 403 in the divided region R1 is given preference.

Note that, even if the coordinate corresponding points 403 are determined to be reduced based on the foregoing methods, when the coordinate corresponding points 403 are positioned at the outer periphery of the captured image 70, or positioned near the inflecting part of the boundary line 801 and the boundary line 802, the coordinate corresponding points 403 may be excluded from being reduced.

FIG. 11(A) is a diagram showing the results of reducing the coordinate corresponding points 403 from FIG. 9(A) based on the foregoing methods. The number of coordinate corresponding points 403 in the divided region R1 is the same as at the time of temporary setting, but the number of coordinate corresponding points 403 in the divided regions R2 and R3 has been reduced in comparison to the time of temporary setting. As a result of reducing the coordinate corresponding points 403 as described above, it is possible to reduce the amount of coordinate corresponding information to be included in the data table 30, and the data volume of the data table 30 can be reduced more than with conventional methods.

FIG. 11(B) is a diagram illustrating the coordinate corresponding points 404 which correspond to the coordinate corresponding points 403 illustrated in FIG. 11(A). The corresponding texture 603B illustrated in FIG. 11(B) corresponds to the texture 603A illustrated in FIG. 11(A). The area ratio m of the corresponding texture 603B relative to the texture 603A is approximately 1, and the distortion of the image caused by the interpolation processing is sufficiently small.

Note that, as described above, in this embodiment, the distortion level of the quadrangle 602A that is distorted at the same level as the quadrangle 602B is set as the distortion level threshold value. Accordingly, the distortion level of the quadrangle 602B in FIG. 11(A) and FIG. 11(B) is the same as the distortion level explained in FIG. 7(A) and FIG. 7(B).

Furthermore, by reducing at the lower region of the captured image 70 so that the maximum value of the distortion level of the quadrangle 601A of the lower region of the captured image 70, due to the image transformation, will be within the distortion level threshold value, the amount of data is reduced while suppressing the distortion of the bird's eye view image 71 to be within a tolerable range.

Figure 12:
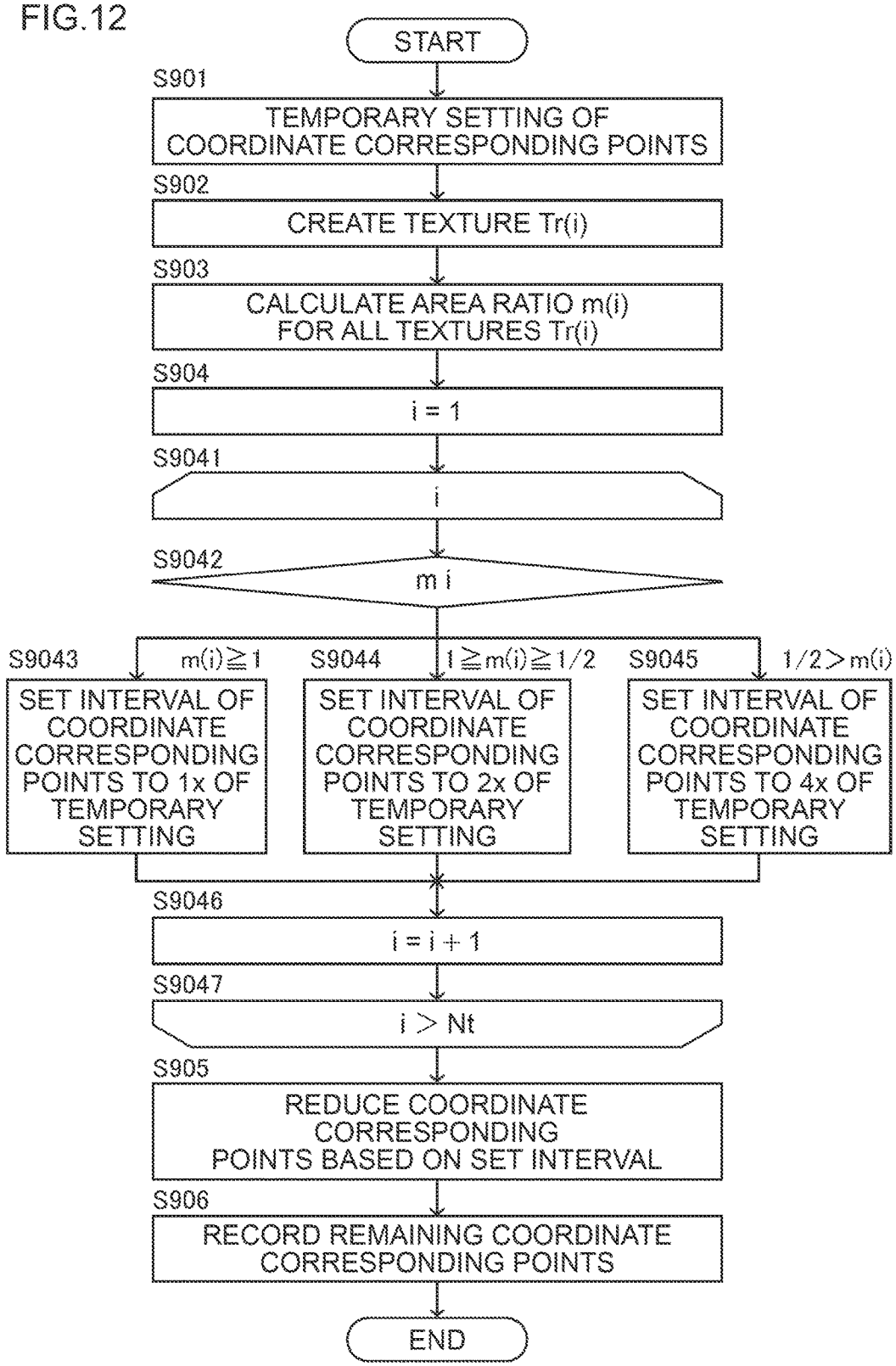
FIG. 12 is a flowchart showing an example of the coordinate transformation table creation method according to an embodiment of the present invention.

FIG. 12 is a flowchart related to the operation of creating the data table 30 with the table creation device 200. The operation of creating the data table 30 shown in FIG. 12 is executed by the control unit 26 of the table creation device 200, which executes the data creation program, when the depression angle and other factors of the virtual viewpoint 310 are defined at the design stage of the image generation device 100.

In step S901, the coordinate corresponding points 403 are temporarily set on the captured image 70 at each predetermined interval Int. Subsequently, mathematical formula (5) is used to calculate the coordinates of the coordinate corresponding points 404 of the bird's eye view image 71 corresponding to the coordinate corresponding points 403. The temporarily set coordinate corresponding points 403 and 404 are stored, as the initial coordinate transformation table, in the storage unit 25 of the table creation device 200. When the temporary setting of the coordinate corresponding points 403 and 404 is ended; that is, when the initial coordinate transformation table is stored, the table creation device 200 proceeds to step S902, and creates all textures Tr(i) formed with the foregoing coordinate corresponding points P1 to P4 with regard to all coordinate corresponding points 403 of the captured image 70.

When all textures Tr(i) are created, the table creation device 200 proceeds to step S903, calculates the area S1(i) of the texture Tr(i) and the area S2(i) of the corresponding texture Tv(i), and calculates the area ratio m(i) of the corresponding texture Tv(i) relative to the texture Tr(i). When the calculation of the area ratio m(i) is completed regarding all textures Tr(i), the table creation device 200 proceeds to step S904.

In step S904, the variable i is initialized to 1 for the subsequent loop of steps S9041 to S9047. In the loop of steps S9041 to S9047, the intervals of the coordinate corresponding points 403 according to the area ratio m(i) are officially set in all textures Tr(i). Based on a single loop of steps S9041 to S9047, the interval of the coordinate corresponding points 403 according to the area ratio m(i) is officially set in one texture T(i). The operation of steps S9041 to S9047 is repeated until it is executed for all textures Tr(i).

When the variable i is initialized to 1 in step S904, the table creation device 200 proceeds to step S9041 and starts the loop. When the loop is started, the table creation device 200 proceeds to step S9042, reads the area ratio m(i) of the texture Tr(i) to be processed, and, depending on the value thereof, determines to which step among step S9043, step S9044, and step S9045 it should proceed. When the area ratio m(i) is 1 or more, the table creation device 200 proceeds to step S9043, and officially sets the interval of the coordinate corresponding points 403 to 1× of the interval Int at the time of temporary setting. When the area ratio m(i) is ½ or more and less than 1, the table creation device 200 proceeds to step S9044, and officially sets the interval of the coordinate corresponding points 403 to 2× of the interval Int at the time of temporary setting. When the area ratio m(i) is less than ½, the table creation device 200 proceeds to step S9045, and officially sets the interval of the coordinate corresponding points 403 to 4× of the interval Int at the time of temporary setting.

When any one of the operations of step S9043, step S9044, and step S9045 is completed, the table creation device 200 proceeds to step S9046, increments the variable i by 1, and switches the texture T(i) to be processed in the next loop. When the variable i is incremented by 1, the table creation device 200 proceeds to step S9047, and determines whether the variable i is greater than the total number Nt of textures T(i). When the variable i is equal to or less than the total number Nt of textures T(i), the table creation device 200 proceeds to step S9041, and executes the operation of steps S9041 to S9047 to the next texture T(i). When the variable i is greater than the total number Nt of textures T(i), the table creation device 200 exits the loop and proceeds to step S905. Based on the foregoing loop processing, the boundary lines 801 and 802 of FIG. 8(A) are defined.

In step S905, based on the officially set intervals of the coordinate corresponding points 403, the coordinate corresponding points 403 are reduced according to the methods illustrated in FIG. 9(A) and FIG. 9(B), and FIG. 10. When the operation of reducing the coordinate corresponding points 403 is completed, the table creation device 200 proceeds to step S906, transforms all coordinate corresponding points 403 that remained without being reduced and calculates the position of the coordinates of the corresponding point 404. The data table 30 is created with the calculation result as the coordinate corresponding information. The data table 30 is stored in the storage unit 25 of the table creation device 200 together with the physical information of the virtual viewpoint; that is, the depression angle and other input parameters. The operation of creating the data table 30 is ended after step S906.

When a plurality of virtual viewpoints are used in the image generation device 100, the operation of creating the data table 30 is repeated by changing the depression angle and other input parameters.

As described above, the data table 30 loaded in the image generation device 100 of the first embodiment can be obtained by mainly executing the following processing according to the procedures shown in FIG. 12 in the processing device of a PC (not shown). Note that the illustration of the input step of inputting the captured image 70, and the reading step of reading the initial coordinate transformation table which transforms the coordinates of the first image and generates the second image is omitted.

(1) In transformation step S901, the input captured image 70 is transformed into the bird's eye view image 71 by using the initial coordinate transformation table having the same data structure as the data table 30.

(2) In computing step S903, the ratio of the area of the texture 601A or 602A formed with the four corresponding points 403 and the area of the corresponding texture 601B or 602B formed with the four selected pixels 404 obtained in correspondence with the texture 601A or 602A is computed with regard to the captured image 70 and the bird's eye view image 71 before and after the image transformation.

(3) In the update steps S9043, S9044, S9045, S905, S906, the data table 30 is updated by selecting the corresponding points 403 so that the array pitch of the corresponding points 404 becomes rougher as the area ratio m of the corresponding texture 601B or 602B relative to the texture 601A or 602A is smaller in accordance with the computed area ratio m.

Which of the first pixels should be reduced can be easily determined according to the area ratio of the first texture and the second texture.

The following operations and effects can be yielded according to the embodiment described above.

(1) The image generation device of the first embodiment; that is, the image generation device 100 performs coordinate transformation, based on a coordinate transformation table, or the data table 30, to a two-dimensional first image, or the captured image 70, having a span in a horizontal direction and a vertical direction and which was acquired by overlooking and imaging an object from a first viewpoint, or the camera 110A, at a first depression angle, and generates and outputs a second image, or the bird's eye view image 71, which was obtained by overlooking the object from a second viewpoint, or the virtual viewpoint 310A, which is different from the first viewpoint at a second depression angle which is different from the first depression angle. The coordinate transformation table 30 transforms the coordinates of a plurality of first selected pixels 403 selected from a plurality of first pixels constituting the first image 70 into the coordinates of the second selected pixels 404 corresponding to a plurality of second pixels constituting the second image.

When generating the coordinate transformation table 30, the first pixels are reduced as follows. The first pixels are reduced so that the array pitch Int of the first selected pixels 403 in the regions R2, R3 on the lower side in the vertical direction of the first image 70 is rougher than the array pitch of the first selected pixels 403 in the region R1 on the upper side in the vertical direction of the first image 70 when the region of the first image is divided into a plurality of regions in the vertical direction based on at least one pixel boundary line; for instance, the boundary line 801 or the boundary line 802, extending in the horizontal direction. The first selected pixels 403 of the coordinate transformation table 30 are the plurality of pixels after reduction.

Accordingly, it is possible to reduce the data volume of a correspondence table which transforms coordinates of an input image into a different image.

(2) The first selected pixels 403 are pixels that were selected by reducing a plurality of first pixels in the horizontal direction at first intervals Int and in the vertical direction at second intervals Int, and the second selected pixels 404 are pixels that were generated by transforming the coordinates of the first selected pixels 403.

Accordingly, it is possible to reduce the data volume of a correspondence table by discretely selecting the first selected pixels 403.

(3) The image generation device 100 comprises a coordinate transformation table 30 which selects the first selected pixels 403 so that the array pitch of the second pixels 404 becomes rougher as the area ratio m of the second texture 601B or 602B relative to the first texture 601A or 602A is smaller, in accordance with the ratio m of an area of the first texture 601A or 602A formed from three or more of the first selected pixels 403 and an area of the second texture 601B or 602B formed from three or more of the second selected pixels 404 obtained in correspondence with the first texture 601A or 602A. Accordingly, by causing the array pitch of the second pixel 404 to be rougher as the area ratio m is smaller, deterioration in the image quality of the bird's eye view image 71, which occurs upon reducing the data volume of the data table 30, can be inhibited.

The following modified examples also fall within the scope of the present invention, one or more of the modified examples may also be combined with the foregoing embodiments.

Modified Example 1

In the foregoing embodiment, while the captured image 70 was divided into three regions with the boundary lines 801, 802, the captured image 70 may also be divided into two regions with at least one boundary line.

Modified Example 2

In FIG. 7(A) and FIG. 7(B), the texture 601A and the corresponding texture 601B are set in a region on the lower side of the image region, and the texture 602A and the corresponding texture 602B are set in a region on the upper side of the image region. It is not necessarily imperative to cause the distortion level of the image in the region on the upper side, from which the corresponding points are not reduced, and the distortion level of the image in the region on the lower side, from which the corresponding points were reduced, to be substantially equal. So as long as the data volume will be reduced, the distortion level of the region on the lower side of the image may be smaller than the distortion level of the region on the upper side of the image.

Modified Example 3

In the foregoing embodiment, while the coordinate corresponding points 403 were disposed on the captured image 70 at predetermined intervals Int in both the horizontal direction and the vertical direction, the intervals of the coordinate corresponding points 403 may be different in the horizontal direction and in the vertical direction. In other words, the coordinate corresponding points 403 may be disposed at first intervals Inth in the horizontal direction, and the coordinate corresponding points 403 may be disposed at second intervals Intv, which are different from the first intervals Inth, in the vertical direction. To put it differently, the coordinate corresponding points 403 may be reduced in the horizontal direction at first intervals Inth and reduced in the vertical direction at second intervals Intv, which differ from the first intervals Inth.

Modified Example 4

In the foregoing embodiment, the images captured with three cameras; specifically, the cameras 110A, 1106, 110C, were synthesized to generate a bird's eye view image of the front of the vehicle. Moreover, the images captured with four cameras; specifically, the cameras 110A, 1106, 110C, 110D, were synthesized to generate a overhead view image which overlooks the vehicle from above the vehicle. In other words, the image generation device of the present invention was explained as a device for synthesizing a plurality of images. Nevertheless, the image generation device of the present invention can also be applied to an image generation device which generates a bird's eye view image, of a captured image captured with one camera, which views the same object at different depression angles from a virtual viewpoint set at a position that differs from the camera.

Modified Example 5

In the foregoing embodiment, while the intervals of the coordinate corresponding points 403 were officially set based on the area ratio m(i) of the texture Tr(i), the intervals of the coordinate corresponding points 403 may also be officially set based on one other than the area ratio m(i) of the texture Tr(i). For instance, the intervals of the coordinate corresponding points 403 may also be officially set based on the positions of the coordinate corresponding points 403 in the input image and the positions of the coordinate corresponding points 404 in the output image.

For instance, the captured image 70 may be divided into the following three regions, and the intervals of the coordinate corresponding points 403 may be officially set as follows for each of these divided regions.

Divided region R11: Configured from a texture in which the Yr coordinates are a predetermined value Y1 or more. Officially set to 1× of the intervals at the time of temporary setting.

Divided region R12: Configured from a texture in which the Yr coordinates are less than a predetermined value Y1 and equal to or greater than a predetermined value Y2. Officially set to 2× of the intervals at the time of temporary setting.

Divided region R13: Configured from a texture in which the Yr coordinates are less than a predetermined value Y2. Officially set to 4× of the intervals at the time of temporary setting.

Moreover, for instance, the bird's eye view image 71 may be divided into the following three regions, and the intervals of the coordinate corresponding points 403 that correspond to the coordinate corresponding points 404 in these divided regions may be officially set as follows.

Divided region R21: Configured from a texture in which the Yv coordinates are a predetermined value Y4 or more. Officially set to 1× of the intervals at the time of temporary setting.

Divided region R22: Configured from a texture in which the Yv coordinates are less than a predetermined value Y4 and equal to or greater than a predetermined value Y5. Officially set to 2× of the intervals at the time of temporary setting.

Divided region R23: Configured from a texture in which the Yv coordinates are less than a predetermined value Y5. Officially set to 4× of the intervals at the time of temporary setting.

While various embodiments and modified examples were explained above, the present invention is not limited to the subject matter thereof. Other modes considered to fall within the technical scope of the present invention are also covered by the scope of the present invention.

Another mode of the present invention is a table creation device 200 for creating a coordinate transformation table, which is the data table 30. The table creation device 200 comprises a storage unit 25 which stores an initial coordinate transformation table for performing coordinate transformation to a two-dimensional first image, or the captured image 70, having a span in a horizontal direction and a vertical direction and which was acquired by overlooking and imaging an object from a first viewpoint at a first depression angle, and generating a second image, or the bird's eye view image 71, which was obtained by overlooking the object from a second viewpoint which is different from the first viewpoint at a second depression angle which is different from the first depression angle (S901); an image input unit, or the image acquisition unit 20, which inputs the captured image 70; an image transformation unit 23 which transforms the input first image into the bird's eye view image 71 as the second image based on the initial coordinate transformation table 30; a computing unit S903 which computes a ratio of an area of the first texture 601A or 602A formed from four first pixels 403 and an area of the second texture 601B or 602B formed from the four second pixels 404 with regard to the captured image 70 and the bird's eye view image 71 before and after the image transformation; and a creation unit which creates the coordinate transformation table by selecting a predetermined number of first pixels from a plurality of first pixels of the initial coordinate transformation table so that an array pitch of the second pixels 404 becomes rougher as an area ratio of the second texture 601B or 602B relative to the first texture 601A or 602A is smaller, in accordance with the computed area ratio S9043, S9044, S9045, S905, S906.

Accordingly, it is possible to reduce the data volume of a correspondence table which transforms coordinates of an input image into a different image.

Yet another mode of the present invention is a method of creating a coordinate transformation table as the data table 30. This creation method comprises: an input step of inputting the captured image 70 as a first image; a reading step of reading an initial coordinate transformation table for performing coordinate transformation to a two-dimensional captured image 70 having a span in a horizontal direction and a vertical direction and which was acquired by overlooking and imaging an object from a first viewpoint at a first depression angle, and generating the bird's eye view image 71 as a second image which was obtained by overlooking the object from a second viewpoint which is different from the first viewpoint at a second depression angle which is different from the first depression angle; a transformation step S901 of transforming the input captured image 70 into the bird's eye view image 71 based on the initial coordinate transformation table 30; a computing step S903 of computing a ratio of an area of the first texture 601A or 602A formed from four first pixels 403 and an area of the second texture 601B or 602B formed from four second pixels 404 obtained in correspondence with the first texture 601A or 602A with regard to the captured image 70 and the bird's eye view image 71 before and after the image transformation; and a creation step S9043, S9044, S9045, S905, S906 of creating the coordinate transformation table by selecting a predetermined number of first pixels from a plurality of first pixels of the initial coordinate transformation table so that an array pitch of the second pixels 404 becomes rougher as an area ratio of the second texture 601B or 602B relative to the first texture 601A or 602A is smaller, in accordance with the computed area ratio.

Accordingly, it is possible to delete the data volume of a correspondence table which transforms coordinates of an input image into a different image.

The disclosure of the following priority application is incorporated herein by reference. Japanese Patent Application No. 2015-021163 (filed on Feb. 5, 2015)

REFERENCE SIGNS LIST

26 Control unit
25 Storage unit
30 Data table
100 Image generation device
200 Table creation device

The invention claimed is:

1. An image generation device that reduces a size of a correspondence table required to transform coordinates of an input image into a different image, the image generation device comprising:
 a plurality of cameras;
 a memory; and
 a processor communicatively coupled to the plurality of cameras and the memory, wherein the processor:
   acquires, using one or more of the plurality of cameras, a first image that contains an object, wherein the first image is acquired from a first viewpoint at a first depression angle,
   divides the first image into a plurality of regions in a vertical direction based on at least one pixel boundary line extending in a horizontal direction,
   selects, for each respective region of the plurality of regions, selected pixels from the first image to form a first plurality of selected pixels, wherein the selected pixels are selected based on an array pitch of pixels in the respective region on a lower side in the vertical direction of the first image becomes rougher than an array pitch of the pixels in the respective region on an upper side in the vertical direction of the first image, forms a coordinate transformation table from the selected pixels of the plurality of regions, wherein the coordinate transformation table translates the selected pixels in the plurality of regions to coordinates of second selected pixels corresponding to a plurality of second pixels constituting a second image, and generates the second image by transforming the first image according to the coordinate transformation table, wherein the second image is from a second viewpoint which is different from the first viewpoint and at a second depression angle which is different from the first depression angle.

2. The image generation device according to claim 1, wherein:

the first selected pixels are pixels selected by reducing the plurality of first pixels in the horizontal direction at first intervals and reducing the plurality of first pixels in the vertical direction at second intervals.

3. The image generation device according to claim 1, wherein:

the selected pixels of the plurality of regions are selected in accordance with a ratio of an area of a first texture formed from three or more of the first selected pixels and a first area of a second texture formed from three or more of the second selected pixels obtained in correspondence with the first texture, the array pitch of the second pixels becomes rougher as an area ratio of the second texture relative to the first texture is smaller.

4. The image generation device according to claim 1, wherein:

the memory stores an initial coordinate transformation table for performing coordinate transformation to a two-dimensional first image acquired by overlooking and imaging an object from a first viewpoint at a first depression angle, and generating a second image which was obtained by overlooking the object from a second viewpoint which is different from the first viewpoint at a second depression angle which is different from the first depression angle;

wherein the processor further:

computes a ratio of an area of a first texture formed from three or more first pixels and an area of a second texture formed from three or more second pixels with regard to the first image and the second image before and after the transforming; and forms the coordinate transformation table by selecting a predetermined number of first pixels from a plurality of first pixels of the initial coordinate transformation table so that an array pitch of second pixels becomes rougher as an area ratio of the second texture relative to the first texture is smaller in accordance with the area ratio computed.

5. An image generation method that reduces a size of a correspondence table required to transform coordinates of an input image into a different image, the method comprising:

receiving, from one or a plurality of cameras, a first image that contains an object, wherein the first image is acquired from a first viewpoint at a first depression angle;

dividing the first image into a plurality of regions in a vertical direction based on at least one pixel boundary line extending in a horizontal direction;

selecting, for each respective region of the plurality of regions, selected pixels from the first image to form a first plurality of selected pixels, wherein the selected pixels are selected based on an array pitch of pixels in the respective region on a lower side in the vertical direction of the first image becomes rougher than an array pitch of the pixels in the respective region on an upper side in the vertical direction of the first image;

forming a coordinate transformation table from the selected pixels of the plurality of regions, wherein the coordinate transformation table translates the selected pixels in the plurality of regions to coordinates of second selected pixels corresponding to a plurality of second pixels constituting a second image; and generating the second image by transforming the first image according to the coordinate transformation table, wherein the second image is from a second viewpoint which is different from the first viewpoint and at a second depression angle which is different from the first depression angle.

* * * * *